(12) United States Patent
Zhang et al.

(10) Patent No.: US 12,108,508 B2
(45) Date of Patent: Oct. 1, 2024

(54) AMBIENT LIGHTING CREATION BASED ON A TARGET COLOR TEMPERATURE RANGE

(71) Applicant: Hewlett-Packard Development Company, L.P., Spring, TX (US)

(72) Inventors: Ron Y Zhang, Fort Collins, CO (US); John Tyler O'Hara Bovee, Spring, TX (US); Mario E. Campos, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/249,163

(22) PCT Filed: Oct. 22, 2020

(86) PCT No.: PCT/US2020/056842
§ 371 (c)(1),
(2) Date: Apr. 14, 2023

(87) PCT Pub. No.: WO2022/086537
PCT Pub. Date: Apr. 28, 2022

(65) Prior Publication Data
US 2023/0397315 A1    Dec. 7, 2023

(51) Int. Cl.
*G09G 3/20* (2006.01)
*G08B 21/18* (2006.01)
(Continued)

(52) U.S. Cl.
CPC ........... *H05B 47/11* (2020.01); *G08B 21/182* (2013.01); *G09G 3/2003* (2013.01); *G09G 5/02* (2013.01);
(Continued)

(58) Field of Classification Search
CPC ...... H05B 47/11; H05B 45/20; G08B 21/182; G09G 3/2003; G09G 2320/0666;
(Continued)

(56) References Cited

U.S. PATENT DOCUMENTS 6,292,228 B1    9/2001  Cho
8,884,939 B2    11/2014 Barnhoefer et al.
(Continued)

FOREIGN PATENT DOCUMENTS

DE    20306342 U1    6/2003

OTHER PUBLICATIONS

NZXT, "Can RGB PC Lighting Actually Be Useful", NZXT, Jun. 16, 2017, Retrieved from: https://blog.nzxt.com/can-rgb-lighting-actually-useful/, pp. 5.
(Continued)

*Primary Examiner* — Adam R. Giesy
(74) *Attorney, Agent, or Firm* — Knobbe, Martens, Olson & Bear, LLP

(57) ABSTRACT

Creating ambient lighting based on a color temperature range may be performed by a computing apparatus storing a non-transitory computer-readable storage medium. The non-transitory computer-readable storage medium may comprise instructions that when executed, cause a processor of the computing apparatus to receive as input, an indication of a target color temperature range for the computing apparatus. The computer-readable storage medium may comprise instructions to compare a measured color temperature on a display of the computing apparatus to the target color temperature range, and using a plurality of color lighting elements communicatively coupled to the computing apparatus, create ambient lighting in an environment surrounding the computing apparatus based on the target color temperature range.

17 Claims, 4 Drawing Sheets

(51) Int. Cl.
  *G09G 5/02* (2006.01)
  *H05B 45/20* (2020.01)
  *H05B 47/11* (2020.01)

(52) U.S. Cl.
  CPC ..... *H05B 45/20* (2020.01); *G09G 2320/0666* (2013.01); *G09G 2354/00* (2013.01); *G09G 2360/144* (2013.01); *G09G 2360/145* (2013.01); *Y02B 20/40* (2013.01)

(58) Field of Classification Search
  CPC ......... G09G 2354/00; G09G 2360/144; G09G 2360/145; G09G 5/02; Y02B 20/40
  See application file for complete search history.

(56) References Cited

U.S. PATENT DOCUMENTS

| | | | |
|---|---|---|---|
| 9,478,157 | B2 | 10/2016 | Wu et al. |
| 9,530,342 | B2 | 12/2016 | Bell et al. |
| 2005/0201617 | A1 | 9/2005 | Park et al. |
| 2006/0077845 | A1 | 4/2006 | Nakai |
| 2009/0059589 | A1* | 3/2009 | Huang .................. H05B 45/22 362/253 |
| 2014/0118155 | A1 | 5/2014 | Bowers et al. |
| 2014/0362065 | A1 | 12/2014 | Fujio et al. |
| 2016/0330368 | A1 | 11/2016 | Liu et al. |
| 2017/0134625 | A1* | 5/2017 | Salazar .................. H04N 23/56 |

OTHER PUBLICATIONS

Teknoware, "Intelligent Lighting Control Systems", https://www.teknoware.com/en/vehicle-lighting/intelligent-lighting-control-systems, retrieved on: Sep. 30, 2020, pp. 3.

* cited by examiner

AMBIENT LIGHTING CREATION BASED ON A TARGET COLOR TEMPERATURE RANGE

BACKGROUND

Electronic devices such as cellular telephones, media players, computers, set-top boxes, wireless access points, and other electronic equipment may include displays. Displays may be used to present visual information and status data and/or may be used to gather user input data. Displays may include image pixels formed from light-emitting diodes (LEDs), organic light-emitting diodes (OLEDs), plasma cells, electrophoretic display elements, electrowetting display elements, liquid crystal display (LCD) components, or other suitable image pixel structures.

DETAILED DESCRIPTION

Figure 1:
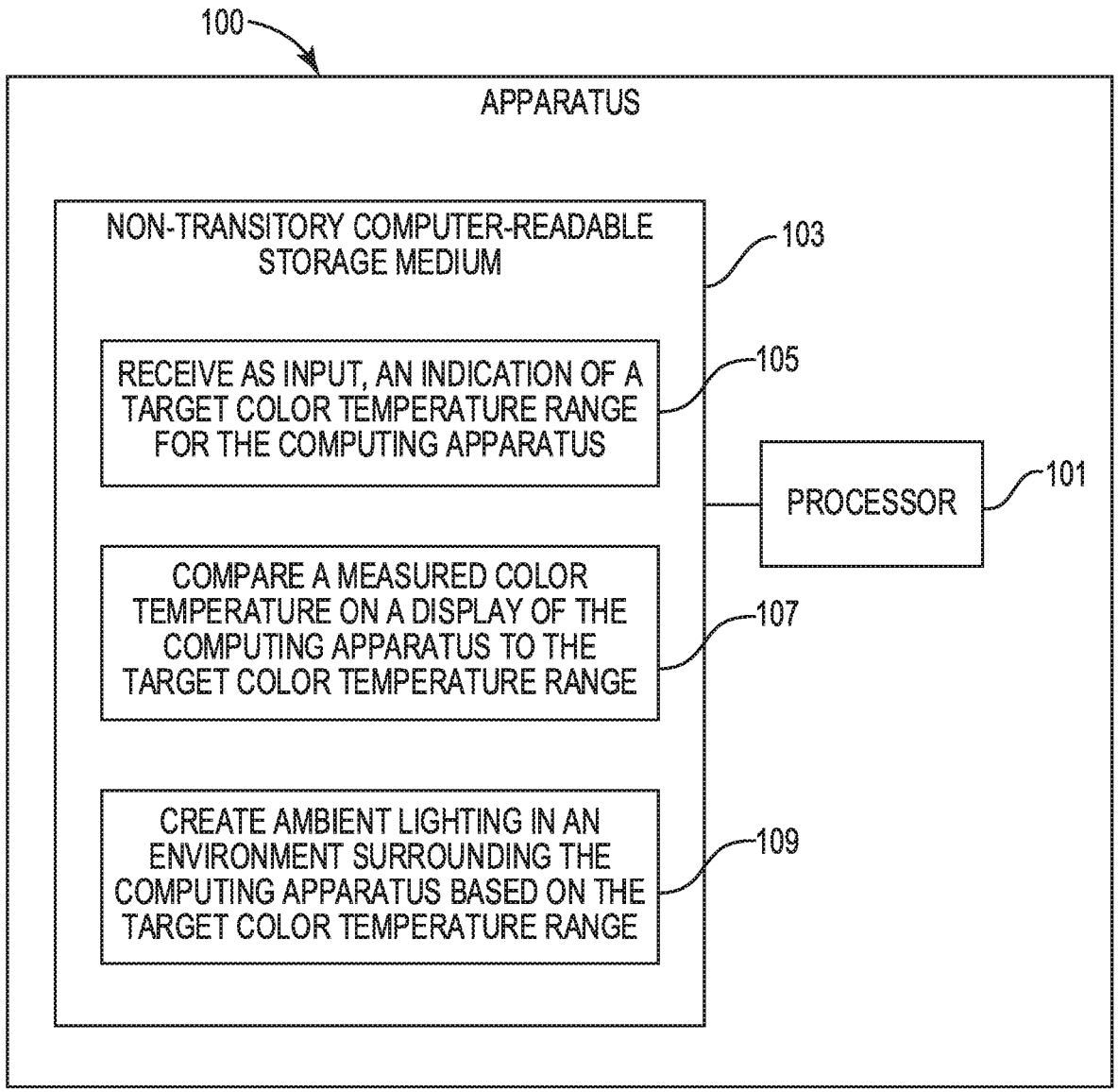
FIG. 1 illustrates an example block diagram of a computing apparatus for creating ambient lighting based on a target color temperature range, including instructions stored in a non-transitory computer-readable storage medium, in accordance with the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Lighting can have a negative influence on a user's project and the creative process. Many times, the color temperature of the project is warmer or cooler than the user intended. To ensure that the color temperature of a project is adhered to, a user may manually set and adjust the ambient lighting temperature. The user may then calibrate the display of the computing device to ensure conformance to the color temperature intended. Manually adjusting and calibrating the display may not help correct changes in color temperatures of a project in development. As such, monitor hoods may be used to block out external lighting and thereby attempt to control the ambient lighting of the surrounding environment.

Creating ambient lighting based on a target color temperature range, in accordance with the present disclosure, allows a user to identify if a project has a color temperature range which exceeds the intended or target temperature range. By creating ambient lighting, color bias may be reduced, thereby allowing the user to correct the color temperature of the project. As used herein, a project refers to or includes an electronic document, video, image, or other composition to be displayed on a graphical user interface of a computing device and including any amount of color.

In some examples, creating ambient lighting based on a color temperature range is performed by a computing apparatus storing a non-transitory computer-readable storage medium. The non-transitory computer-readable storage medium may comprise instructions that when executed, cause a processor of the computing apparatus to receive as input, an indication of a target color temperature range for the computing apparatus. The computer-readable storage medium may comprise instructions to compare a measured color temperature on a display of the computing apparatus to the target color temperature range, and using a plurality of color lighting elements communicatively coupled to the computing apparatus, create ambient lighting in an environment surrounding the computing apparatus based on the target color temperature range.

As a further example, the non-transitory computer-readable storage medium may comprise instructions that when executed, cause the processor of the computing apparatus to, using a plurality of color lighting elements communicatively coupled to the computing apparatus, create ambient lighting in an environment surrounding the computing apparatus based on a target color temperature range. The computer-readable storage medium may include instructions to compare a measured color temperature on a display of the computing apparatus to the target color temperature range, and provide an alert in response to the measured color temperature exceeding the target color temperature range.

As yet another example, creating ambient lighting based on a target temperature range may be performed by a computing apparatus including a display. The computing apparatus may further include a plurality of color lighting elements, wherein each of the plurality of color lighting elements selectively display a particular color or particular combination of colors responsive to input from the computing apparatus. The computing apparatus may include a non-transitory computer-readable storage medium comprising instructions that when executed, cause a processor of the computing apparatus to receive as input, an indication of a target color temperature range for the display. The computer-readable storage medium may comprise instructions to compare a measured color temperature on the display to the target color temperature range, and to create ambient lighting in an environment surrounding the display based on the target color temperature range. Yet further, the computer-readable storage medium may store instructions to provide an alert on the display based on the comparison.

Turning now to the figures, FIG. 1 illustrates an example block diagram of a computing apparatus for creating ambient lighting based on a target color temperature range, including instructions stored in a non-transitory computer-readable storage medium, in accordance with the present disclosure. As illustrated in FIG. 1, the computing apparatus 100 may include a processor 101, and a computer-readable storage medium 103.

The processor 101 may be a central processing unit (CPU), a semiconductor-based microprocessor, and/or other hardware device suitable to control operations of the computing apparatus 100. Computer-readable storage medium 103 may be an electronic, magnetic, optical, or other physical storage device that contains or stores executable instructions. Thus, computer-readable storage medium 103 may be, for example, Random Access Memory (RAM), an Electrically Erasable Programmable Read-Only Memory (EEPROM), a storage device, an optical disc, etc. In some examples, the computer-readable storage medium 103 may be a non-transitory storage medium, where the term 'non-transitory' does not encompass transitory propagating signals. As described in detail below, the computer-readable storage medium 103 may be encoded with a series of executable instructions 105, 107, and 109.

In various examples, computer-readable storage medium 103 includes instructions 105 that when executed by the processor 101, cause the processor 101 to receive as input, an indication of a target color temperature range for the computing apparatus. For instance, a user may provide as input a color temperature range for the computing apparatus 100 to conform to. In some examples, the color temperature range is specific for a particular project. In some examples, the color temperature range is specific for the computing apparatus 100 and may be applied across all projects.

As used herein, a color temperature refers to or includes a color appearance provided by a light emitting source. The color temperature may be measured in degrees of Kelvin (K) on a scale from 1,000 to 10,000. Also as used herein, a color temperature range refers to or includes consecutive colors within a range of temperatures. For instance, color temperatures over 5000 K may be referred to as "cool colors" (bluish), while lower color temperatures (2700-3000 K) may be referred to as "warm colors" (yellowish). While "cool colors" and "warm colors" are provided herein as examples of color temperature ranges, examples of color temperature ranges are not limited to those two examples. For instance, a user may specify a numerical range of color temperatures as measured in degrees of K on a scale from 1,000 to 10,000 K for a particular project and/or computing apparatus.

In various examples, the computer-readable storage medium 103 includes instructions 107 that when executed by the processor 101, cause the processor 101 to compare a measured color temperature on a display of the computing apparatus 100 to the target color temperature range. For instance, various aspects of the computing apparatus 100 may measure color values of the pixels on a display of the computing apparatus 100 and determine the color temperature of the colors on the display. As an example, if a user has created a graphical image on a display of the computing apparatus 100, the processor 101 may measure color values in the graphical image. In various examples, the processor 101 may compare the measured color temperature against the target color temperature. Various actions may be taken if the measured color temperature varies from the target color temperature, as discussed further herein.

In various examples, computer-readable storage medium 103 includes instructions 109 that when executed by the processor 101, cause the processor 101 to, using a plurality of color lighting elements communicatively coupled to the computing apparatus 100, create ambient lighting in an environment surrounding the computing apparatus 100 based on the target color temperature range. For instance, a plurality of color lighting elements may be disposed on various surfaces which are either on the computing apparatus 100 and/or communicatively coupled to the computing apparatus 100. As non-limiting examples, the color lighting elements may include a light strip communicatively coupled to the computing apparatus 100, a light strip disposed on a surface of the computing apparatus 100, red green blue (RGB) LEDs on a mouse communicatively coupled to the computing apparatus 100, RGB LEDs on a keyboard of the computing apparatus 100, among others. Using the plurality of color lighting elements, the computing apparatus 100 may adjust the ambient lighting so as to impact the environment in which the computing apparatus 100 is operating.

As an example, the instructions 109 to create ambient lighting may include instructions that when executed, cause the processor 101 to send instructions to a keyboard lighting system, a mouse lighting system, a light strip, or combinations thereof, wherein each of the keyboard lighting system, the mouse lighting system, and the light strip are communicatively coupled to the computing apparatus 100. Each of the keyboard lighting system, the mouse lighting system, and the light strip may include RGB LEDs, such that a range of color temperatures may be achieved. Using the available RGB lighting elements, such as RGB keyboards, RGB mouse, RGB lighting strips, RGB light bulbs, and any other RGB lighting elements available, the computing apparatus 100 may create ambient lighting to positively influence the user.

As an example, if a person is operating the computing apparatus 100 in an environment, the user may gravitate towards using the complementary colors in a project. For example, if the lighting surrounding the user has a warm color temperature, the user may gravitate towards using cooler colors in order to compensate for the warmth in the environment. If the lighting surrounding the user has a cool color temperature, the user may gravitate towards using warmer colors in order to compensate for the cool environment. If, while working on a project which the user indicates should have a neutral color temperature range, the computing apparatus 100 determines that the measured color temperature range is warm, the computing apparatus 100 may create ambient light that is warm, which influences the user to adjust the color temperature range of the project to a cooler color temperature range. As a further example, if the measured color temperature range is neutral, the computing apparatus 100 may create ambient light that is neutral, which may not influence the user to change the color temperature range of the project.

Accordingly, the computer-readable medium 103 may include instructions that when executed, cause the processor 101 to measure the color temperature on the display by measuring color values for pixels on the display. The computer-readable medium 103 may further include instructions that when executed, cause the processor 101 to measure ambient lighting in the environment using a light sensor on the computing apparatus 100. In various examples, the environment in which the computing apparatus 100 operates may have a color temperature of the ambient light which may influence the user during operation. For instance, a user operating the computing apparatus 100 in sunlight is exposed to a different color temperature range as opposed to a user operating the computing apparatus 100 in a windowless building with fluorescent lighting. The computing apparatus 100 may measure the ambient lighting of the environment, and create the ambient lighting in the environment in part based on the measured ambient lighting. The computing apparatus 100 may measure the ambient lighting of the environment at the start of a project and/or throughout the project in real-time or near real-time. By measuring the ambient lighting of the environment at the start of the project, the computing apparatus 100 may create ambient lighting to influence the user at the outset of the project. By measuring the ambient lighting of the environment throughout the project in real-time or near real-time, the computing apparatus 100 may adjust for changes in the ambient lighting over time, and dynamically adjust based on a change in the color temperature of the project in execution.

Figure 2:
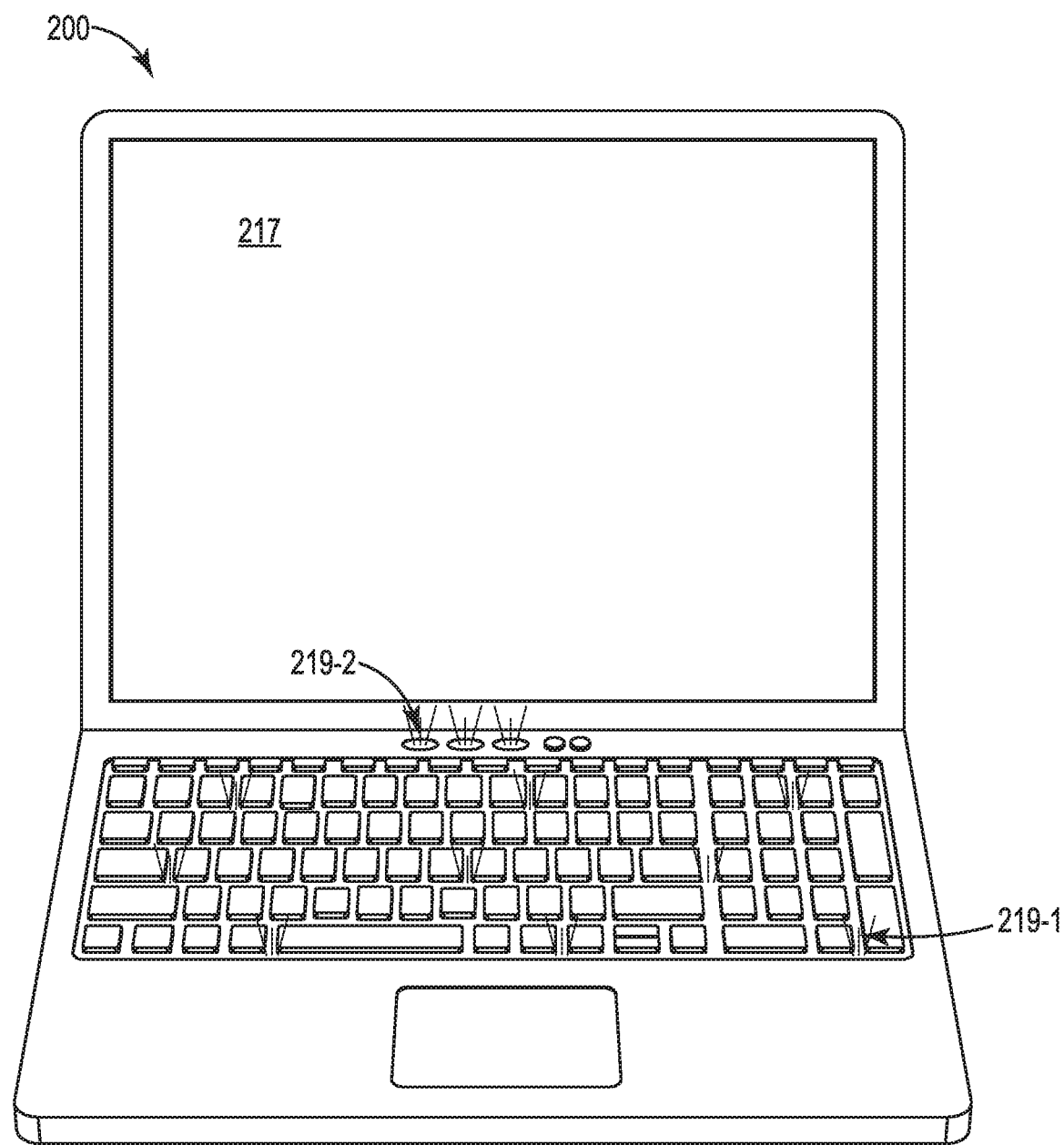
FIG. 2 illustrates an example computing apparatus for creating ambient lighting based on a target color temperature range, in accordance with the present disclosure.

FIG. 2 illustrates an example computing apparatus for creating ambient lighting based on a target color temperature range, in accordance with an example of the present disclosure. As illustrated in FIG. 2, a user may use computing apparatus 200 for creating a project with a target color temperature range, as described with regards to FIG. 1. The computing apparatus 200 includes a display 217 that illustrates a project created by the user and various RGB lighting elements 219-1, 219-2. As the display 217 illustrates the project created by the user, the various RGB lighting elements 219-1, 219-2 (collectively referred to herein as RGB lighting elements 219) may display a particular color or combination of colors to create ambient lighting. For instance, if the project on the display 217 has a neutral color temperature, the RGB lighting elements 219 may display neutral colors. Similarly, if the project on the display 217 has a warm color temperature, the RGB lighting elements 219 may display warm colors. Moreover, if the project on the display 217 has a cool color temperature, the RGB lighting elements 219 may display cool colors.

By displaying different colors on the RGB lighting elements 219, the user can identify whether the project has a color temperature that is outside of the target color temperature range. Moreover, the RGB lighting elements 219 may (subconsciously) influence the user to adjust the color temperature of the project, thereby correcting the difference in color temperature range.

Figure 3:
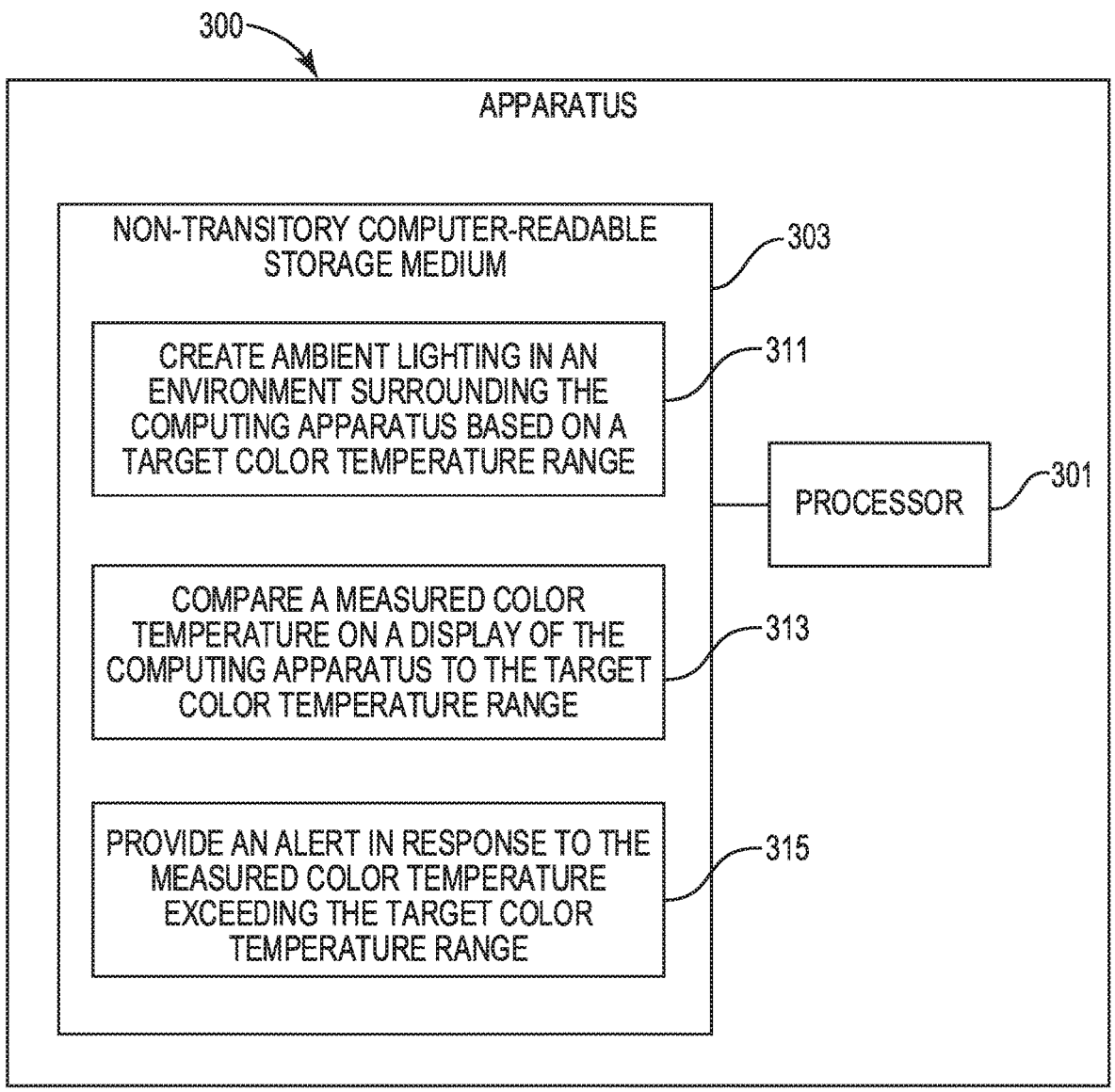
FIG. 3 illustrates an example block diagram of a computing apparatus for creating ambient lighting based on a target color temperature range, including instructions stored in a non-transitory computer-readable storage medium, in accordance with the present disclosure.

FIG. 3 illustrates an example block diagram of a computing apparatus for creating ambient lighting based on a target color temperature range, including instructions stored in a non-transitory computer-readable storage medium, in accordance with the present disclosure. As illustrated in FIG. 3, the computing apparatus 300 may include a processor 301, and a computer-readable storage medium 303.

The processor 301 may be a CPU, a semiconductor-based microprocessor, and/or other hardware device suitable to control operations of the computing apparatus 300. Computer-readable storage medium 303 may be an electronic, magnetic, optical, or other physical storage device that contains or stores executable instructions. Thus, computer-readable storage medium 303 may be, for example, RAM, an EEPROM, a storage device, an optical disc, etc. In some examples, the computer-readable storage medium 303 may be a non-transitory storage medium, where the term 'non-transitory' does not encompass transitory propagating signals. As described in detail below, the computer-readable storage medium 303 may be encoded with a series of executable instructions 311, 313, and 315.

In various examples, the computer-readable storage medium 303 includes instructions 305 that when executed by the processor 301, cause the processor 301 to, using a plurality of color lighting elements communicatively coupled to the computing apparatus 300, create ambient lighting in an environment surrounding the computing apparatus 300 based on a target color temperature range. As described with regards to FIG. 1 and FIG. 2, the processor 301 may create the ambient lighting based on a measured temperature of the ambient lighting, as well as a target color temperature range for a project and/or for the computing apparatus 300.

In various examples, the computer-readable storage medium 303 includes instructions 305 that when executed by the processor 301, cause the processor 301 to compare a measured color temperature on a display of the computing apparatus to the target color temperature range. For instance, as discussed with regards to FIG. 1 and FIG. 2, color measurements may be obtained for pixels on display 217, and compared against the target color temperature range.

In various examples, the computer-readable storage medium 303 includes instructions 305 that when executed by the processor 301, cause the processor 301 to provide an alert in response to the measured color temperature exceeding the target color temperature range. For instance, the instructions to provide an alert may include instructions that when executed, cause the processor 301 to display a particular color or particular combination of colors using the plurality of color lighting elements in response to the measured color temperature exceeding the target color temperature range. As an example, if the measured color temperature range exceeds the target color temperature range, the RGB lighting elements may create ambient lighting to influence a change in the color temperature of the project. The RGB lighting elements may display a light strip with a pattern of colors which change based on the measured color temperature range.

In some examples, the instructions to provide an alert include instructions that when executed, cause the processor 301 to display a particular color or particular combination of colors using a subset of the plurality of color lighting elements in response to the measured color temperature exceeding the target color temperature range. For instance, a user may specify that a particular RGB lighting element communicatively coupled to the computing apparatus 300 may change to a particular color (e.g., red) when the color temperature range of the project exceeds the target color temperature range. In such examples, the color or plurality of colors displayed by the particular RGB lighting element may be independent of the ambient lighting created by the remaining RGB lighting elements.

In some examples, the instructions to provide an alert include instructions that when executed, cause the processor 301 to display a prompt on the display of the computing apparatus 300 in response to the measured color temperature exceeding the target color temperature range. For instance, an alert box may be provided on a display of the user interface of the computing apparatus 300, indicating to the user that the color temperature range of the project exceeds the target color temperature range. The display may provide the user with options to adjust the ambient lighting. Accordingly, the computer-readable medium 303 may further include instructions that when executed, cause the processor 301 to provide an interactive menu on the display of the computing apparatus 300, and to receive from the interactive menu, a modified color temperature for the display. Based on a comparison of the modified color temperature and the target color temperature range, the computing apparatus may adjust the created ambient lighting. As such, a user may receive an alert, indicating that the measured color temperature range exceeds the target color temperature range, and the ambient lighting may change to adjust the ambient lighting to influence the color temperature range of the project. The user may, in response to the alert on the display, dynamically adjust the color temperature range of their project and in real-time or near real-time, observe a change in the ambient lighting created by the RGB lighting elements.

Figure 4:
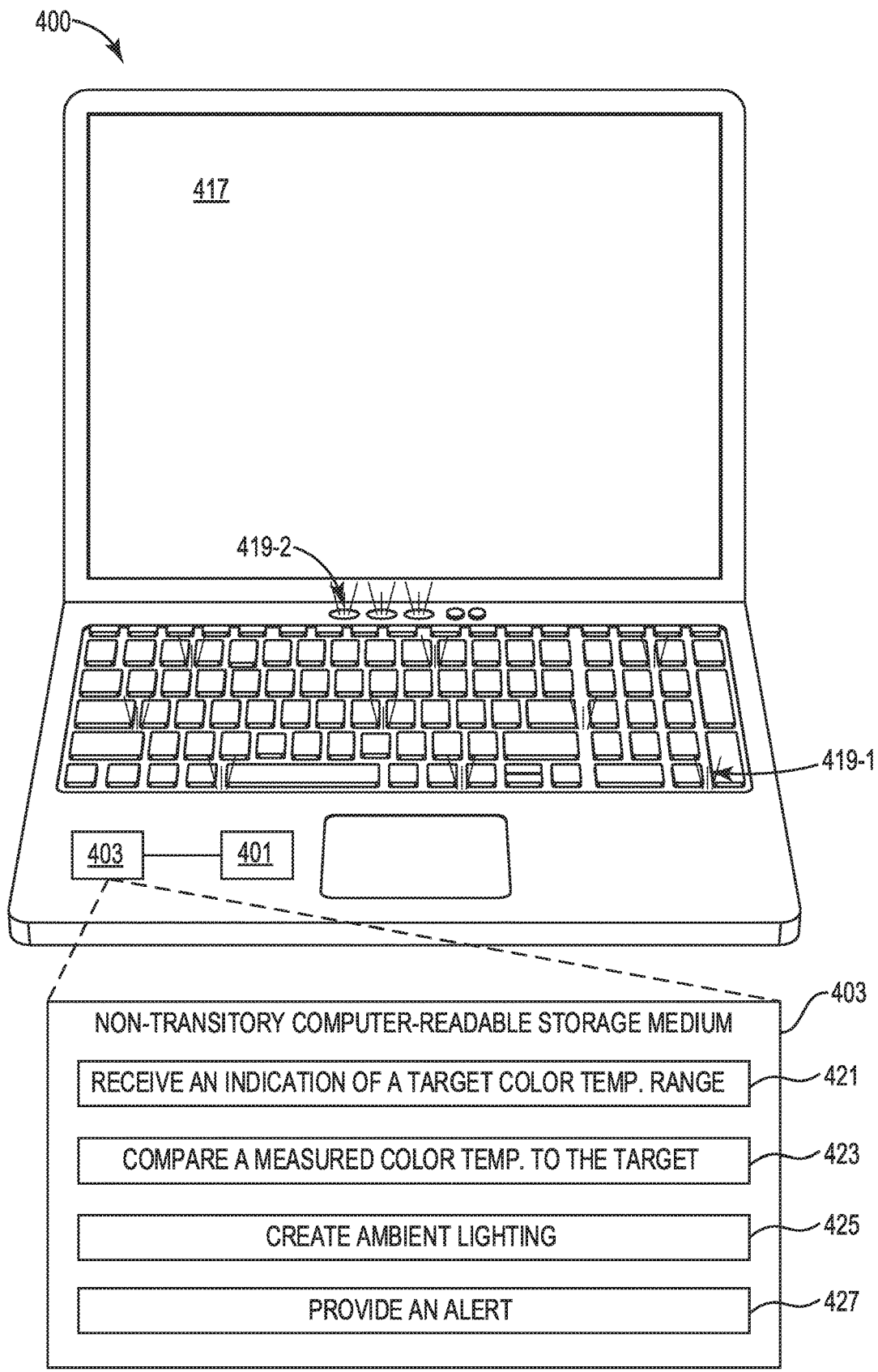
FIG. 4 illustrates an example block diagram of a computing apparatus for creating ambient lighting based on a target color temperature range, in accordance with the present disclosure.

FIG. 4 illustrates an example block diagram of a computing apparatus for creating ambient lighting based on a target color temperature range, in accordance with the present disclosure. As illustrated in FIG. 4, the computing apparatus 400 includes a display 417, and a plurality of color lighting elements 419 (also referred to as RGB lighting elements 419). As described herein, each of the plurality of color lighting elements 419 selectively display a particular color or particular combination of colors responsive to input from the computing apparatus 400, and a non-transitory computer-readable storage medium 403.

As illustrated in FIG. 4, the computing apparatus 400 may include a processor 401, and a computer-readable storage medium 403. The processor 401 may be a CPU, a semiconductor-based microprocessor, and/or other hardware device suitable to control operations of the computing apparatus 400. Computer-readable storage medium 403 may be an electronic, magnetic, optical, or other physical storage device that contains or stores executable instructions. Thus, computer-readable storage medium 403 may be, for example, RAM, an EEPROM, a storage device, an optical disc, etc. In some examples, the computer-readable storage medium 403 may be a non-transitory storage medium, where the term 'non-transitory' does not encompass transitory propagating signals. As described in detail below, the computer-readable storage medium 403 may be encoded with a series of executable instructions 421, 423, 425, 427.

The non-transitory computer-readable storage medium 403, as illustrated, includes instructions 421 that when executed, cause the processor 401 to receive as input, an indication of a target color temperature range for the display 417. As discussed herein, the indication of the target color temperature range may be a range of colors such as "cool tones", "neutral tones", or "warm tones" as non-limiting examples, and/or may be a range of color temperatures as measured in Kelvins.

The non-transitory computer-readable storage medium 403, may also store instructions 423 that when executed, cause the processor 401 to compare a measured color temperature on the display to the target color temperature range. Various actions may be taken in response to the comparison of the measured color temperature and the target color temperature range.

Accordingly, the non-transitory computer-readable storage medium 403, may store instructions 425 that when executed, cause the processor 401 to create ambient lighting in an environment surrounding the display based on the target color temperature range. Similarly, the non-transitory computer-readable storage medium 403, may store instructions 425 that when executed by the processor 401, cause the processor 401 to provide an alert on the display based on the comparison.

In various examples, the non-transitory computer-readable storage medium 403 includes instructions that when executed, cause the processor 401 to display a temperature of color light using the plurality of color lighting elements 419 based on the comparison. The light may be displayed on all of the color lighting elements 419 coupled to the computing apparatus 400, and/or on a subset of the color lighting elements 419. As an illustration, the processor 401 may display warm color tones using the plurality of color lighting elements 419 in response to a determination that the measured color temperature is warmer than the target color temperature range. Similarly, the processor 401 may display cool color tones using the plurality of color lighting elements 419 in response to a determination that the measured color temperature is cooler than the target color temperature range.

As described herein, the color lighting elements 419 may include a plurality of different types of devices. For instance, the color lighting elements 419 may comprise a part of the computing apparatus itself, such as displayed on a backside of a notebook computer. As another illustration, the color lighting elements 419 may comprise a light strip on a table on which the computing apparatus operates. The color lighting elements 419 may comprise part of a keyboard which forms part of the computing apparatus, and/or may be a separate component from the computing apparatus (as may be the case for a wireless keyboard). In some examples, the color lighting elements 419 may be internet-capable devices which are communicatively coupled to the computing apparatus, as may be the case for Internet of Things (I) systems. In such examples, a color lighting element 419 among the plurality of color lighting elements may include an internet-capable light bulb. Accordingly, the non-transitory computer-readable storage medium 403 may include instructions that when executed, cause the processor 401 to display a particular color or particular combination of colors on the internet-capable light bulb, based on the comparison.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A non-transitory computer-readable storage medium comprising instructions that when executed, cause a processor of a computing apparatus to:
   receive as input, an indication of a target color temperature range for the computing apparatus;
   compare a measured color temperature on a display of the computing apparatus to the target color temperature range; and
   using a plurality of color lighting elements external to and separate from the display and communicatively coupled to the computing apparatus, create ambient lighting in an environment surrounding the computing apparatus based on the target color temperature range,
   wherein creating ambient lighting in an environment surrounding the computing apparatus comprises illuminating the display by the plurality of color lighting elements.

2. The medium of claim 1, including instructions that when executed, cause the processor to measure the color temperature on the display by measuring color values for pixels on the display.

3. The medium of claim 1, wherein each of the plurality of color lighting elements includes a red green blue (RGB) lighting element, and wherein the instructions to create ambient lighting include instructions that when executed, cause the processor to send instructions to a keyboard lighting system, a mouse lighting system, a light strip, or combinations thereof, wherein each of the keyboard lighting system, the mouse lighting system, and the light strip are communicatively coupled to the computing apparatus.

4. The medium of claim 1, further including instructions that when executed, cause the processor to measure ambient lighting in the environment using a light sensor on the computing apparatus.

5. The medium of claim 4, further including instructions that when executed, cause the processor to create the ambient lighting in the environment in part based on the measured ambient lighting.

6. The medium of claim 5, further including instructions that when executed cause the processor to create a warm color temperature ambient lighting in the environment when it is determined that the measured ambient lighting is in a warm color temperature range and to create a cool color temperature ambient lighting in the environment when it is determined that the measured ambient lighting is in a cool color temperature range.

7. The medium of claim 6, wherein the warm color temperature range is 2700-3000 K and the cool color temperature range is over 5000 K.

8. A non-transitory computer-readable storage medium comprising instructions that when executed, cause a processor of a computing apparatus to:
   using a plurality of color lighting elements communicatively coupled to the computing apparatus, create ambient lighting in an environment surrounding the computing apparatus based on a target color temperature range;
   compare a measured color temperature on a display of the computing apparatus to the target color temperature range; and
   provide an alert in response to the measured color temperature exceeding the target color temperature range,
   wherein the plurality of color lighting elements are external to the display; and
   wherein creating ambient lighting in an environment surrounding the computing apparatus comprises illuminating the display by the plurality of color lighting elements.

9. The medium of claim 8, wherein the instructions to provide an alert include instructions that when executed, cause the processor to display a particular color or particular combination of colors using the plurality of color lighting elements in response to the measured color temperature exceeding the target color temperature range.

10. The medium of claim 8, wherein the instructions to provide an alert include instructions that when executed, cause the processor to display a particular color or particular combination of colors using a subset of the plurality of color lighting elements in response to the measured color temperature exceeding the target color temperature range.

11. The medium of claim 8, wherein the instructions to provide an alert include instructions that when executed, cause the processor to display a prompt on the display of the computing apparatus in response to the measured color temperature exceeding the target color temperature range.

12. The medium of claim 8, further including instructions that when executed, cause the processor to:
   provide an interactive menu on the display of the computing apparatus;
   receive from the interactive menu, a modified color temperature for the display; and
   based on a comparison of the modified color temperature and the target color temperature range, adjust the created ambient lighting.

13. A computing apparatus, comprising:
   a display;
   a plurality of red green blue (RGB) color lighting elements external to the display, wherein each of the plurality of RGB lighting elements selectively display a particular color or particular combination of colors responsive to input from the computing apparatus; and
   a non-transitory computer-readable storage medium comprising instructions that when executed, cause a processor of the computing apparatus to:
      receive as input, an indication of a target color temperature range for the display;
      compare a measured color temperature on the display to the target color temperature range;
      create ambient lighting in an environment surrounding the display based on the target color temperature range; and
      provide an alert on the display based on the comparison,
      wherein creating ambient lighting in an environment surrounding the display comprises illuminating the display by the plurality of RGB lighting elements.

14. The computing apparatus of claim 13, wherein the non-transitory computer-readable storage medium further includes instructions that when executed, cause the processor to display a temperature of color light using the plurality of RGB lighting elements based on the comparison.

15. The computing apparatus of claim 13, wherein the non-transitory computer-readable storage medium further includes instructions that when executed, cause the processor to display warm color tones using the plurality of RGB lighting elements in response to a determination that the measured color temperature is warmer than the target color temperature range.

16. The computing apparatus of claim 13, wherein the non-transitory computer-readable storage medium further includes instructions that when executed, cause the processor to display cool color tones using the plurality of RGB lighting elements in response to a determination that the measured color temperature is cooler than the target color temperature range.

17. The computing apparatus of claim 13, wherein an RGB lighting element among the plurality of RGB lighting elements includes an internet-capable light bulb, and wherein the non-transitory computer-readable storage medium further includes instructions that when executed, cause the processor to display a particular color or particular combination of colors based on the comparison.

* * * * *